United States Patent
Stojkovski et al.

[11] Patent Number: 5,875,670
[45] Date of Patent: Mar. 2, 1999

[54] TOOL FOR ROLL CRIMPING A FLANGE COVER

[75] Inventors: Nenad Stojkovski, Farmington Hills, Mich.; Bay Le, Stratford, Canada

[73] Assignee: The Standard Products Company, Cleveland, Ohio

[21] Appl. No.: 861,860

[22] Filed: May 22, 1997

Related U.S. Application Data

[60] Provisional application No. 60/025,470 Jul. 31, 1996.

[51] Int. Cl.$^6$ .................................................. B21D 17/10
[52] U.S. Cl. ........................ 72/211; 29/243.58; 29/243.5
[58] Field of Search .................... 72/210, 211; 29/243.5, 29/243.58, 235, 525.05

[56] References Cited

U.S. PATENT DOCUMENTS

| | | |
|---|---|---|
| 3,680,346 | 8/1972 | Wilcox ...................................... 72/211 |
| 4,172,313 | 10/1979 | Takahashi . |
| 4,996,756 | 3/1991 | Bright et al. . |
| 5,031,293 | 7/1991 | Goedderz et al. . |
| 5,065,486 | 11/1991 | Goedderz . |
| 5,115,551 | 5/1992 | Goedderz et al. . |
| 5,155,890 | 10/1992 | Goedderz . |
| 5,169,081 | 12/1992 | Goedderz . |
| 5,237,730 | 8/1993 | Goedder . |
| 5,237,741 | 8/1993 | Goedderz . |

FOREIGN PATENT DOCUMENTS 0317086  12/1994  European Pat. Off. .

*Primary Examiner*—Joseph J. Hail, III
*Assistant Examiner*—Rodney Butler
*Attorney, Agent, or Firm*—Harness, Dickey & Pierce, P.L.C.

[57] ABSTRACT

A tool for roll crimping a flange cover onto a flange, the tool having a body, a first roller having an axis and being supported on and fixed to a first shaft having a coincident axis, and a second roller having an axis and being supported on and fixed to a second shaft having a coincident axis, the rollers being biased toward one another. The first shaft and second shaft are rotatingly driven and one of the axes is movable relative to the body which allows the first and second rollers to move toward one another.

9 Claims, 2 Drawing Sheets

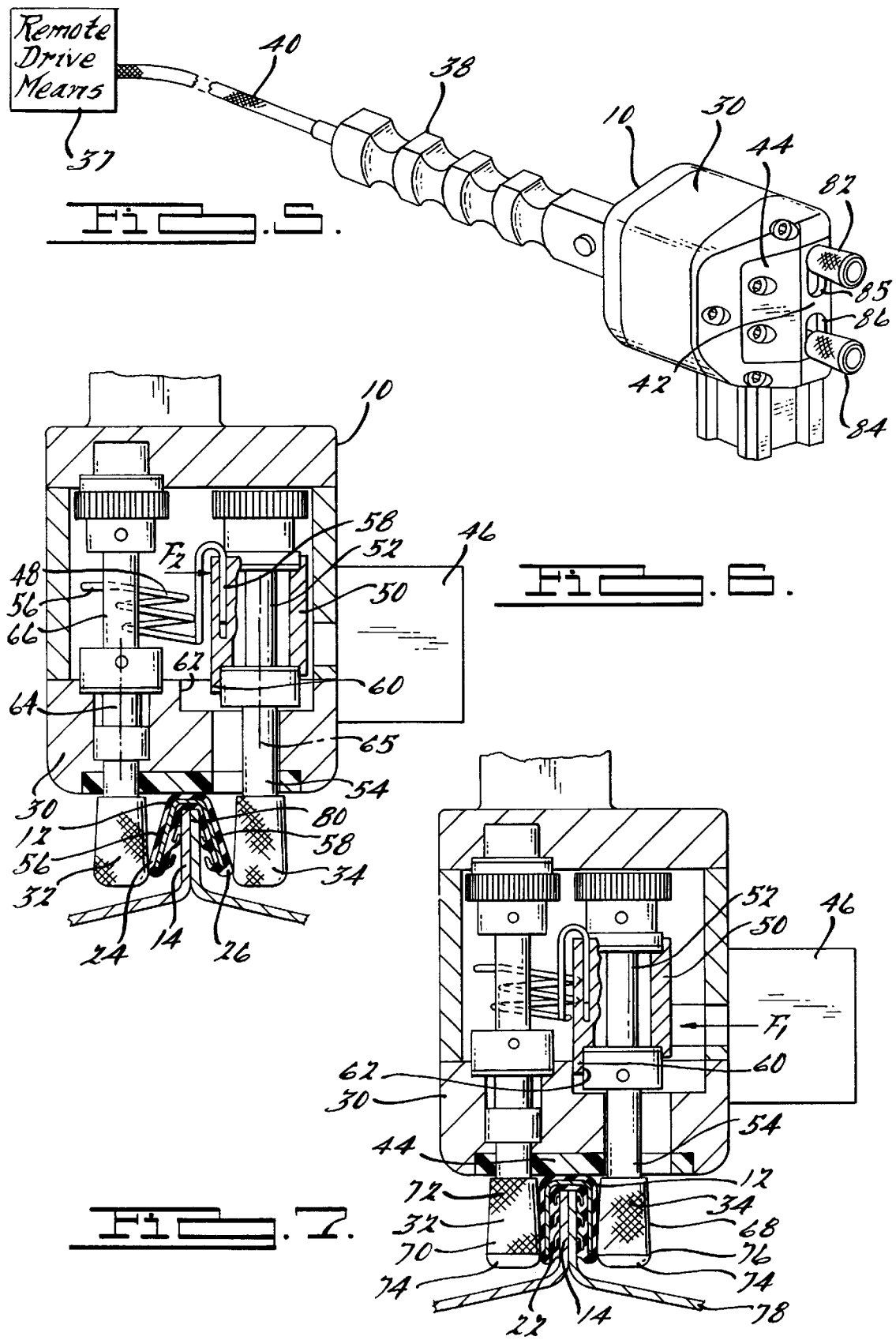

TOOL FOR ROLL CRIMPING A FLANGE COVER

This application claims benefit of provisional application 60/025,470 filed Jul. 31, 1996.

BACKGROUND ON THE INVENTION

1. Technical Field

This invention generally relates to a tool and method for crimping a flange cover onto a flange and, more particularly, to a tool and method for roll crimping a flange cover or sealing strip to a flange at an opening to a vehicle body.

2. Discussion

Openings in a vehicle body, such as a door opening or a trunk opening, often contain several flanges which are welded together to join an interior panel or reinforcement, with an exterior body panel of the vehicle. These flanges are often exposed when the door or trunk is opened and are commonly covered by a flange cover to improve the aesthetic appearance, or are covered using a sealing strip which improves both the aesthetic appearance and provides a sealing surface which is used to prevent water or other environmental conditions from entering the interior of the vehicle or the trunk, as the case may be.

It is common within the industry to have the flange cover formed in a generally U-shaped configuration such that the mouth of the U is generally the same width as the thickness of the flanges which it will cover. Installation of the flange cover in this condition is often difficult since the cover must be forced over the flanges. This operation is commonly done by hand, and may result in variations of the flange cover height relative to the flange. Further, it is important that the flange cover be tight to the flange on both sides of the flange, since the friction between the flange cover and the flange is the primary or sole means of retention.

The invention disclosed and described herein reduces or resolves several of the disadvantages encountered with the current method of installation as described above.

SUMMARY OF THE INVENTION

In accordance with the teachings of the present invention, there is provided a tool having a body from which extends a first roller having a fixed axis, and a second roller having a freely floating axis which remains parallel to the fixed axis of the first roller. A first biasing means urges the first and second roller to a closed position wherein the rollers are nearer to one another. A driving means is connected to the tool either directly or remotely, such that the first and second roller are rotatingly driven.

BRIEF DESCRIPTION OF THE DRAWINGS

The various advantages of the present invention will become apparent to one skilled in the art upon reading the following specification and by reference to the drawings in which:

FIG. 5 is a perspective view of a second preferred embodiment of a tool made in accordance with the teachings of the present invention;

FIG. 6 is a partial sectional view through a preferred embodiment of the present invention shown in an open position; and FIG. 7 is a partial sectional view through a preferred embodiment of the present invention shown in a closed position.

DETAILED DESCRIPTION OF THE PREFERRED EMBODIMENTS

The following description of the preferred embodiments is merely exemplary in nature and is in no way intended to limit the scope of the invention, its application, or its uses.

Figure 1:
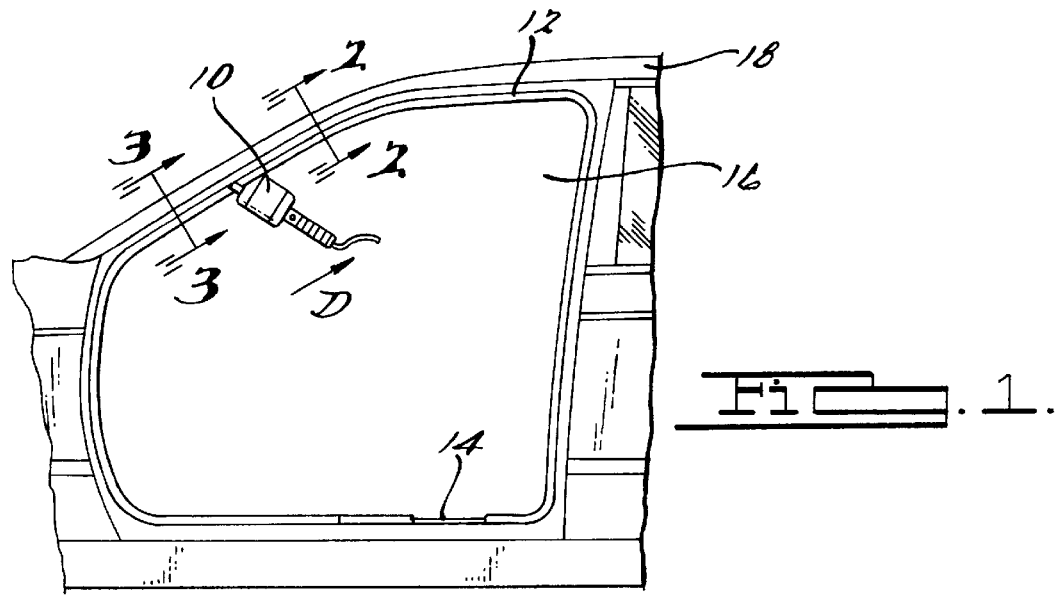
FIG. 1 is a side elevation view of a preferred embodiment of the present invention as utilized on a typical automobile door opening.

Referring to FIG. 1, there is shown a first preferred embodiment of the roll crimping tool made in accordance with the teachings of the present invention. The crimping tool 10 is used to secure a flange cover 12 to a weld flange or flanges 14 which are typically located in an opening 16 of a vehicle body 18. Examples of such openings include, but are not limited to, the front and rear door openings, a trunk opening, or a liftgate opening.

Figure 2:
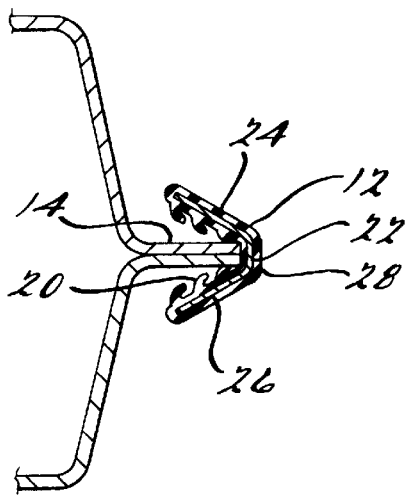
FIG. 2 is a sectional view of a flange cover positioned on the flange of the door opening in FIG. 1 prior to being crimped by a tool made in accordance with the teachings of the present invention.

As shown in FIG. 2, the flange cover 12 is generally comprised of an extruded plastic or rubber retention portion 20 within which is embedded a core 22. The core 22 of a flange cover 12 utilized in conjunction with crimping tool 10 may be either a stamped metal core, a wire mesh core, or any other core construction which when compressed along its leg portions 24 and 26 will substantially remain in such a compressed state by being permanently deformed, as opposed to plastic deformation wherein the material returns to its prior formation after being acted upon by the compressive forces. This permanent deformation increases the retention forces between the flange cover 12 and flange 14, thereby securing flange cover 12 to flange 14.

The flange cover 12 is originally presented to the flange 14 in an open condition as shown in FIG. 2. This open condition allows an operator to easily position the flange cover 12 around the entire periphery of the opening 16 (shown in FIG. 1) and onto the flange 14 prior to fully securing the flange cover 12 to flange 14 by using crimping tool 10. The open condition is created by having the leg portions 24 and 26 of the generally U-shaped flange cover 12 initially formed at an angle greater than 90 degrees relative to the web 28 of the flange cover 12.

Figure 3:
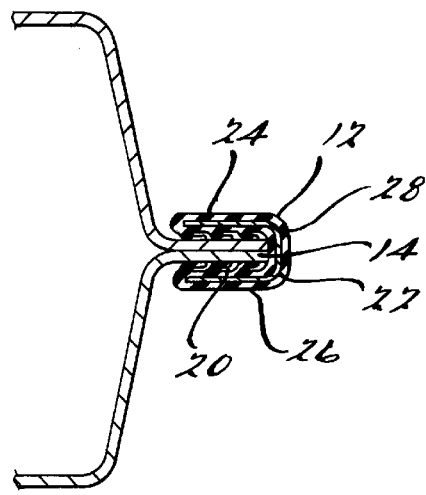
FIG. 3 is a sectional view of a flange cover positioned on the flange of the door opening in FIG. 1 after being crimped by a tool made in accordance with the teachings of the present invention.

FIG. 3 shows the flange cover of FIG. 2 after being positioned on flange 14 and being crimped by crimping tool 10. Leg portions 24 and 26 of the U-shaped flange cover 12 are forced to a generally parallel condition with flange 14, and retention portion 20 is forced to securely contact flange 14 by core 22 having been permanently deformed by the closing forces of crimping tool 10. This secure contact between retention portion 20 and flange 14 provides sufficient frictional retention of the flange cover 12 such that it will not lift from or move on the flange 14.

Figure 4:
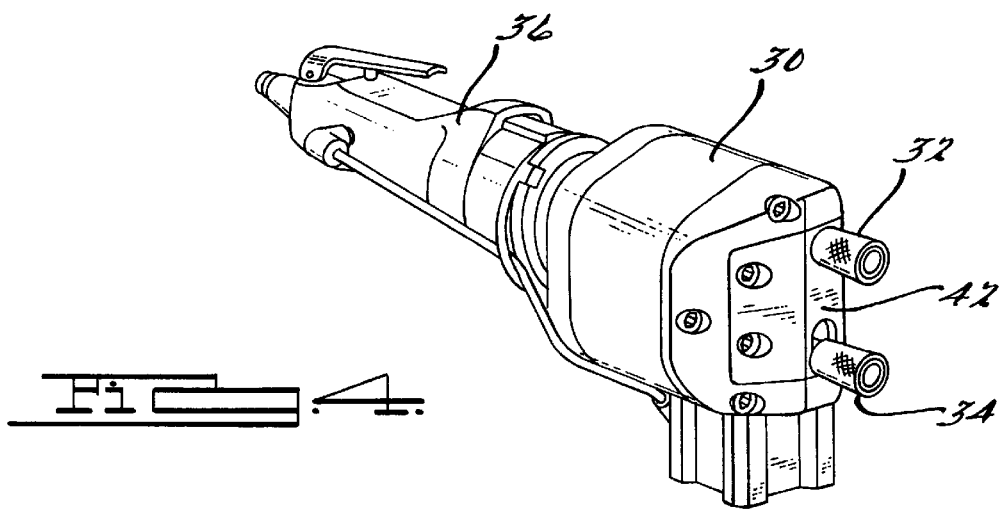
FIG. 4 is a perspective view of a preferred embodiment of the present invention.

FIG. 4 generally shows a preferred embodiment of a roll crimping tool 10 made in accordance with the teachings of the present invention. As shown, crimping tool 10 has a body 30 supporting a first roller 32 and a second roller 34. Rollers 32 and 34 are used to apply a compressive force on the leg portions 24 and 26 of flange cover 12 when rollers 32 and 34 are activated and are in a closed position (shown in FIG. 7). The body 30 further provides for attachment to a drive means 36. Drive means 36 may be attached directly to body 30 if it is of appropriate size and weight for the operator to handle conveniently.

Alternately, as shown in FIG. 5, a handle 38 may be utilized in conjunction with body 30, and a remote drive means 37 may be used. A flexible shaft 40, or other appropriate means, is then required between remote drive means 37 and tool 10 to transfer the driving force from remote drive means 37 to tool 10.

Referring now to FIGS. 4 and 5, the body 30 further includes a contact surface 42 which is placed in contact with flange cover 12 when tool 10 is being used by an operator. The contact surface 42 may be made of the same material as the remainder of body 30 and includes at least that portion of body 30 which is located between the first roller 32 and the second roller 34. Alternately, a surface insert 44 can be added, as shown in FIG. 5. Surface insert 44 is a removable piece that can be replaced as tool 10 is used and the contact surface 42 experiences wear. Surface insert 44 may be made of the same material as body 30, or may be made of a different material, such as nylon or polytetrafluoroethylene, which will reduce any friction between the flange cover 12 and the tool 10 as it advances around the periphery of opening 16. By utilizing a material which reduces friction and improves the interface between flange cover 12 and tool 10 any damage which may have otherwise occurred to flange cover 12 can be reduced or eliminated.

With reference now to FIGS. 4, 6, and 7 it is shown that first roller 32 and second roller 34 each extend beyond the body 30 of tool 10. The first roller 32 is fixed in its position while the second roller 34 freely floats relative to the fixed position of the first roller 32. The free floating position of the second roller 34 is determined by the coordination of a first biasing means 46 and a second biasing means 48 acting in opposition to one another, the variation in thickness of flange 14, and any variation in flange cover 12 itself.

The first biasing means 46 is utilized to urge the first roller 32 and the second roller 34 to a closed position (shown in FIG. 7) in which the distance between first and second rollers, 32 and 34 respectively, is reduced. This is accomplished by the first biasing means 46 acting on a movable block 50 which supports movable shaft 52. Free floating second roller 34 is attached to a first end 54 of movable shaft 52. First biasing means 46 includes any variable position biasing device, such as, but not limited to, an air cylinder, or electrical positioning device, which will apply a generally consistent force (indicated in FIG. 7 by the arrow $F_1$) through substantially the full range of motion of the free floating second roller 34.

The second biasing means 48 operates to urge the first roller 32 and the second roller 34 to an open position (shown in FIG. 6) in which the distance between first and second rollers 32 and 34 respectively, is increased. In the preferred embodiment shown, this is accomplished by a first end 56 of the second biasing means 48 being held in a fixed position relative to the fixed position first roller 32, and a second end 58 of the second biasing means 48 attached to and acting on movable block 50 which supports the shaft 52 to which the free floating second roller 34 is attached. The second biasing means 48 may include a compression spring, a tension spring, a torsional spring (as shown), or any other biasing device which gives a generally constant force (indicated in FIG. 6 by the arrow $F_2$) through substantially the full range of motion of the free floating second roller 34.

When the crimping tool 10 is in a non-activated or deactivated state (for example when no air pressure or electrical power is supplied to the first biasing means 46) the force $F_2$ of second biasing means 48 overcomes force $F_1$ of first biasing means 46 thereby urging the second roller 34 to an open position as shown in FIG. 6. This open position allows an operator to easily position the tool 10 over the flange cover 12, placing first roller 32 on a first side 56 of flange cover 12, and second roller 34 on the opposite side 58 of flange cover 12, without forcing the leg portions 24 and 26 to a closed position. When, for example, air pressure or electrical power is supplied to first biasing means 46, the tool 10 is in an activated state (shown in FIG. 7) and first biasing means 46 is energized. When energized first biasing means 46 provides a consistent force $F_1$ to the free floating second roller 34 by way of movable block 50. Force $F_1$ is greater than the force $F_2$ of the second biasing means 48, thereby causing second roller 34 to close upon the flange cover 12, and crimp the flange cover 12 onto flange 14 positioned between leg portions 24 and 26.

Depending upon the particular application, the closing force $F_1$ can be incrementally varied. A first configuration is to set $F_1$ sufficiently high so that a stop portion 60 of moveable block 50 comes in contact with or "bottoms out" on a stop surface 62 of body 30. This is considered to be a full closed position. This configuration has the advantage of providing a generally known distance between the axes 64 and 65 of fixed shaft 66 and moveable shaft 52, respectively. The radius of first roller 32 and second roller 34 can be selected to provide the appropriate or desired spacing which will properly crimp flange cover 12. At the same time the above described configuration provides an open position when first biasing means 46 is in the non-activated state allowing for easy positioning of tool 10 over flange cover 12 in its open condition. Stop portion 60 or stop surface 62 may have an adjustment to set the final spacing between first roller 32 and second roller 34.

A second configuration provides for setting the closing force $F_1$ at a specific setting (less than that of the first configuration). Closing force $F_1$ urges the second roller 34 toward first roller 32 until the combined force of the second biasing means 48 ($F_2$) and the outward directed reaction force ($F_R$) resulting from compressing flange cover 12, equal closing force $F_1$. (i.e. $F_2+F_R=F_1$). This provides an equilibrium in which the reaction force $F_R$, which is the force compressing and crimping flange cover 12, is a known, consistent force since $F_1$, and $F_2$ are known and generally consistent throughout the range of motion of free floating roller 34. The second configuration still has the advantage of an open position when first biasing means 46 is in the non-activated state allowing for easy positioning of tool 10 over flange cover 12 in its open condition. Further, the second configuration allows for applying a known generally consistent crimping force (equal to and opposite from reaction force $F_R$) instead of a particular fixed distance between first roller 32 and second roller 34, A consistent force is applied to crimp flange cover 12 regardless of the thicknesses of flange 14 that occur around the periphery of opening 16 (shown in FIG. 1). Further, the distance between axis 64 and axis 65 can vary to accommodate variations in flange 14 or flange cover 12, or both, while still providing a generally consistent force for crimping flange cover 12.

Generally coincident with the activation of first biasing means 46 is the activation of the drive means 36, or remote drive means 37 as the case may be. This provides rotational driving force to both first roller 32 and second roller 34. The drive means 36 or remote drive means 37, may be powered by an electric motor, by compressed air, or by any other suitable means. The fixed position first roller 32 and the free floating second roller 34 are driven in opposite directions and at generally the same rotational speed. The tool moves in a forward direction (Arrow D in FIG. 1) when contact is made with first side 56 and opposite side 58 of the flange cover 12. The theoretical linear speed of tool 10 is generally equal to the revolutions per minute of shaft 66 or 52 multiplied by the circumference of roller 32 or 34 as shown in the equation:

Linear Speed=RPM×2πr.

The drive means, 36 or 37, incorporates a power bypass (not shown), such as a clutching mechanism or a bleed off valve as appropriate for the type of drive means used. The power bypass is adjusted such that as the combined frictional forces between the contact surface 42 and flange cover 12, and the side loading forces on shafts 52 and 66 increase the power transferred by the drive means, 36 or 37, to first roller 32 and second roller 34 is reduced. The combined forces and the power bypass slow the linear speed of the tool 10 along the flange cover 12 providing greater operator control along areas of the flange which require it. The frictional portion of the forces increases due to first and second roller 32 and 34 being forced away from one another when a thicker flange 14, or multiple flanges, are encountered. As first and second roller 32 and 34 are forced further apart, a greater amount of contact surface 42 is brought in contact with web 28 of flange cover 12, thereby creating a greater frictional resistance because of the increased surface area contact. The side loading on shafts 52 and 66 will also typically increase as a thicker flange or multiple flanges are encountered.

The profile 68 of first roller 32 and second roller 34 is specifically designed depending upon the type of flange cover 12 which they are to be used with. Profile 68 is intended to coordinate with each flange cover 12 such that after the flange cover 12 is crimped by first roller 32 and second roller 34, the core 22 is generally parallel to flange 14 and there is no particular area of leg portion 24 or 26 which is crimped tighter than any other area. The final position of leg portions 24 and 26 are generally shown in FIG. 3.

In addition to the profile 68 of first and second rollers 32 and 34 being coordinated with each flange cover 12 it is intended to be used with, the surface 70 of rollers 32 and 34 may have a gnarl pattern 72 or some other texture superimposed upon surface 70. This pattern 72 provides sufficient friction between rollers 32 and 34 and flange cover 12 such that tool 10 will be pulled in the direction of travel (arrow D in FIG. 1) around opening 16 and will overcome the frictional resistance between surface 42 and flange cover 12. Pattern 72 also prevents slipping of rollers 32 and 34 on flange cover 12 which could damage the surface appearance or degrade performance of the flange cover.

A protective cap 74 may also be attached to or incorporated in a first end 76 of rollers 32 and 34. Cap 74 prevents the first end 76 of rollers 32 and 34 from contacting a body panel 78 from which flange 14 is formed. Cap 74 is typically made of a non-abrasive, non-marring material, such as teflon or nylon, which will not harm panel 78 or any finish which has been applied to panel 78.

It is envisioned that a further alternate embodiment of a tool built according to the teachings of the present invention could incorporate a third roller parallel to and offset from contact surface 42, and positioned to contact the web 28 of flange cover 12 prior to the first and second rollers 32 and 34 applying a crimping force. Alternately, the contact surface 42 could incorporate a formation which partially encapsulates a ball bearing or a roller bearing such that an exposed portion of the bearing is in contact with the flange cover prior to the first or second roller applying a crimping force. Other low friction means or devices may also be incorporated with the intent and purpose of applying an increased load upon the web 28 of flange cover 12 such that flange cover 12 is securely positioned against an end portion 80 of flange 14 prior to the crimping force being applied.

One skilled in the art will readily understand that the structure of the free floating second roller can be incorporated in place of the first fixed roller, thereby providing a roll crimping tool having two free floating rollers. As shown in FIG. 5, the free floating first roller 82 and free floating second roller 84 are allowed to travel within coordinated slots 85 and 86.

The foregoing discussion discloses and describes preferred embodiments of the present invention. One skilled in the art will readily recognize from such discussion and from the accompanying drawings and claims, that various changes, modifications, and variations can be made therein without departing from the true spirit and fair scope of the invention.

What is claimed is:

1. A tool for roll crimping a flange cover onto a flange, said tool comprising:

a body;

a first roller supported on and fixed to a first shaft extending from said body, said first roller and said first shaft each having an axis coincident with one another;

a second roller supported on and fixed to a second shaft extending from said body, said second roller and said second shaft each having an axis coincident with one another;

wherein at least one of said axes is movable relative to said body;

a first biasing means for urging said first roller and said second roller toward one another upon selective activation;

a second biasing means for urging said first roller and said second roller away from one another; and means for rotatingly driving said first shaft and said second shaft;

whereupon activation, said first biasing means overcomes said second biasing means and moves at least one axis toward the other securing the flange cover to the flange by frictional retention between the flange cover and the flange.

2. The tool of claim 1 wherein said first biasing means is variable in an amount of force applied to urge said second roller toward said first roller.

3. The tool of claim 1 wherein said first biasing means provides a constant amount of force to said flange cover while allowing the axis of said first roller and the axis of said second roller to vary in distance relative to one another.

4. The tool of claim 1 wherein the axis of said first roller and the axis of said second roller are each movable relative to said body.

5. The tool of claim 2 wherein said amount of force applied by said first biasing means is such that said second roller is urged to and held in a full closed position thereby providing a fixed distance between the axis of said first roller and the axis of said second roller.

6. The tool of claim 4 wherein said first biasing means is variable in an amount of force applied to urge said first roller and said second roller toward one another.

7. The tool of claim 4 wherein said first biasing means provides a constant amount of force to said flange cover while allowing the axis of said first roller and the axis of said second roller to vary in distance relative to one another.

8. The tool of claim 6 wherein said amount of force applied by said first biasing means is such that said first roller and said second roller are urged to and held in a full closed position thereby providing a fixed distance between the axis of said first roller and the axis of said second roller.

9. A method of installing and crimping a flange cover wherein said method comprises the steps of:

positioning said flange cover on a flange of a vehicle body opening, said flange cover having leg portions in a generally open condition;

placing a crimping tool on said flange cover such that a first roller is on a first side of said flange cover and a second roller is on an opposite side of said flange cover, said first and second rollers being in an open position allowing for ease of installation over said flange cover;

activating said crimping tool thereby energizing a first biasing means which urges said first roller and said second roller toward one another, and engaging a driving means which provides driving rotation to said first roller and said second roller;

securing said flange cover by permanently deforming said leg portions of said flange cover to a generally parallel position relative to said flange as said first and second rollers are driven along said flange cover by rotating said first and second rollers;

deactivating said crimping tool thereby disengaging said driving means and de-energizing said first biasing means such that a second biasing means urges said first and second rollers to said open position; and removing said crimping tool from said flange cover, said flange cover being retained on said flange by a retention portion of said flange cover being forced to securely contact said flange by said leg portions having been permanently deformed by said first and second rollers.

* * * * *